(12) United States Patent
Hwang et al.

(10) Patent No.: US 11,498,620 B2
(45) Date of Patent: Nov. 15, 2022

(54) SCRUM TYPE SIDE SILL STRUCTURE FOR ELECTRIC VEHICLE

(71) Applicants: HYUNDAI MOTOR COMPANY, Seoul (KR); KIA MOTORS CORPORATION, Seoul (KR)

(72) Inventors: Chang-Sup Hwang, Seongnam-si (KR); Seung-Woo Han, Hwaseong-si (KR); Dae-Myoung Park, Suwon-si (KR); Kyung-Hoon Son, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 100 days.

(21) Appl. No.: 17/180,047

(22) Filed: Feb. 19, 2021

(65) Prior Publication Data

US 2022/0111904 A1  Apr. 14, 2022

(30) Foreign Application Priority Data

Oct. 12, 2020  (KR) .................. 10-2020-0130936

(51) Int. Cl.
*B60J 7/00* (2006.01)
*B62D 25/02* (2006.01)
*B62D 21/15* (2006.01)
*B60K 1/04* (2019.01)
*B62D 27/06* (2006.01)

(52) U.S. Cl.
CPC .............. *B62D 25/025* (2013.01); *B60K 1/04* (2013.01); *B62D 21/157* (2013.01); *B62D 27/065* (2013.01); *B60K 2001/0438* (2013.01)

(58) Field of Classification Search
CPC .............. B62D 25/025; B62D 25/2036; B62D 21/157; B62D 25/04; B62D 25/20; A63B 69/345; A61P 29/00; A61P 43/00; B61D 7/00; G06Q 10/06
See application file for complete search history.

(56) References Cited

U.S. PATENT DOCUMENTS

| 2018/0134320 | A1* | 5/2018 | Jeong | B62D 21/157 |
| 2019/0009834 | A1* | 1/2019 | Kageyama | B62D 21/157 |
| 2020/0140017 | A1* | 5/2020 | Schuppert | B62D 25/025 |
| 2020/0282816 | A1* | 9/2020 | Matsuda | B60K 1/04 |
| 2021/0070371 | A1* | 3/2021 | Ebisumoto | B62D 21/02 |
| 2021/0078642 | A1* | 3/2021 | Grattan | B62D 25/04 |
| 2021/0309297 | A1* | 10/2021 | Matecki | B62D 21/15 |
| 2022/0041219 | A1* | 2/2022 | Son | B62D 25/025 |

FOREIGN PATENT DOCUMENTS

KR  10-2013-0101890 A  9/2013

\* cited by examiner

*Primary Examiner* — Kiran B Patel
(74) *Attorney, Agent, or Firm* — Lempia Summerfield Katz LLC

(57) ABSTRACT

A scrum type side sill includes: a side sill inner located on a side surface of a center floor, wherein the center floor forms a bottom of a vehicle body; a side sill outer coupled to the side sill inner and configured to form a side sill inner space; and a plurality of scrum members provided in the side sill inner space in a longitudinal direction of the vehicle.

13 Claims, 7 Drawing Sheets

SECTION A-A

■ Welding Position

SCRUM TYPE SIDE SILL STRUCTURE FOR ELECTRIC VEHICLE

CROSS-REFERENCE TO RELATED APPLICATION

This application claims priority to and the benefit of Korean Patent Application No. 10-2020-0130936, filed on Oct. 12, 2020, the entire contents of which are incorporated herein by reference.

FIELD

The present disclosure relates to a side sill structure for an electric vehicle, and particularly, to a scrum type side sill structure for an electric vehicle.

BACKGROUND

The statements in this section merely provide background information related to the present disclosure and may not constitute prior art.

Generally, an electric vehicle satisfies a traveling distance extension request by increasing the size of a high-voltage battery among batteries.

The reason is that the electric vehicle may locate the high-voltage battery on the lower end of a center floor rather than the conventional method for locating the high-voltage battery on the rear floor for the common use with the internal combustion engine vehicle. Particularly, the lower end of the center floor has the structural feature capable of securing the layout advantageous for increasing the size of the high-voltage battery.

Furthermore, in recent years, as the electric vehicle market rapidly grows, the safety of the electric vehicle in case of a side pole collision (e.g., telegraph pole collision) is also becoming important. The reason is that the high-voltage battery having the fire riskiness due to damage is mounted on the lower end of the center floor, which is more vulnerable to the side pole collision in the electric vehicle, such that the high-voltage battery with the increased size increases the damage riskiness and also increases the fire riskiness in the side pole collision.

Therefore, there are advantages in that the electric vehicle lowers the damage riskiness of the high-voltage battery with the side pole collision reinforcement structure according to the increase in the size of the high-voltage battery, and to this end, does not have to change the center floor structure by changing the side sill to an extruded material type side sill or a steel press type side sill.

As an example, the extruded material type side sill applies an aluminum extruded material to the inner space of the side sill inner/outer (i.e., bracket panel) as a grid structure, such that the aluminum extruded material reinforces the collision rigidity of the side sill. Further, the steel press type side sill bends a plurality of steel press components to tie them by welding and applies them to the inner space of the side sill inner/outer (i.e., bracket panel) as a bending structure, such that the steel press components reinforce the collision rigidity of the side sill.

Therefore, the electric vehicle applies the side pole collision reinforcement structure capable of reducing the deformation due to the collision with the extruded material type side sill or the steel press type side sill even while using the large-sized high-voltage battery capable of extending the traveling distance using the center floor, thereby coping with the rapidly growing electric vehicle market with the extended traveling distance and the collision safety reinforcement.

However, the extruded material type side sill and the steel press type side sill applied with the side pole collision reinforcement structure of the electric vehicle have the following disadvantages compared to the protection of the high-voltage battery by the reduction of the collision deformation.

As an example, the extruded material type side sill has significant difficulty in securing cost competitiveness for a vehicle body of the electric vehicle due to the high cost of the aluminum extruded material, and particularly, the transverse cross section does have the coupling between the structures, such that the cross section inevitably expands upon the transverse impact of the side pole collision.

As an example, the steel press type side sill has the price competitiveness compared to the aluminum extruded material but has the significantly increased weight due to the plurality of steel components and the welding coupling therebetween, thereby increasing the weight of the vehicle body of the electric vehicle. Particularly, the steel press type side sill not only has the directionality advantageous for supporting the longitudinal load, thereby being vulnerable to the transverse impact of the side pole collision, and but also has a lot of cross-sectional deformation of the steel press component compared to the aluminum extruded material, thereby being inevitably disadvantageous in terms of the impact energy support performance.

Most importantly, the extruded material type side sill and the steel press type side sill have the side sill inner structures not coupled with the seat cross member, such that the load transfer due to the side pole collision is cut off. Here, the seat cross member is a component configuring the vehicle body so as to serve to support the transverse deformation of the side sill with the transverse member within the center floor.

The contents described in Background section are to help the understanding of the background of the present disclosure, and may include what is not previously known to those skilled in the art to which the present disclosure pertains.

SUMMARY

The present disclosure provides a scrum type side sill structure for an electric vehicle, which has the directionality advantageous for supporting a transverse load with a scrum member adopting the transversely and consecutively arranged rigidity cross-sectional structure together with the transverse cross-sectional structure having the coupling between the structures of the welding coupling components, thereby being advantageous for supporting impact energy applied by the transverse impact of the side pole collision. Particularly, the scrum member is coupled with a seat cross member through a side sill, thereby enabling the consecutive load transfer with a triple coupling support structure.

A scrum type side sill structure includes: a side sill inner located on the side surface of a center floor forming the bottom of a vehicle body, a side sill outer coupled to the side sill inner to form a side sill inner space, and a plurality of first, second, third, and fourth scrum members provided in the side sill inner space in the vehicle longitudinal direction.

In one form, the side sill inner, the side sill outer, and the scrum member are fixed by welding, and particularly, the scrum member is fixed to the side sill inner by welding.

In one form, the first, second, third, and fourth scrum members are adjacent to each other and arranged in the vehicle longitudinal direction, and each of the first scrum member, the second scrum member, the third scrum member, and the fourth scrum member is composed of an upper bracket and a lower bracket in which a scrum inner space is formed.

In one form, the first scrum member, the second scrum member, the third scrum member, and the fourth scrum member are divided into a front scrum member and a rear scrum member for the adjacent scrum members to form an upper coupling portion and a lower coupling portion, in which the upper coupling portion forms the triple coupling of the upper bracket of the front scrum member and the upper bracket and the lower bracket of the rear scrum member, and the lower coupling portion forms the triple coupling of the upper bracket and the lower bracket of the front scrum member and the lower bracket of the rear scrum member.

In one form, the upper coupling portion and the lower coupling portion are formed on a side surface portion in which the upper bracket and the lower bracket are in contact with each other, and the triple coupling is fixed by welding.

In one form, the upper bracket and the lower bracket are fastened by a pipe nut vertically stood in the linear length to form the scrum inner space.

In one form, the upper bracket uses a nut fastening part to which the upper portion of the pipe nut is fastened as an intermediate section to form a left bending wing body and a right bending wing body; the lower bracket uses a nut fastening part to which the lower portion of the pipe nut is fastened as an intermediate section to form a left vertical wing body and a right vertical wing body; and the left bending wing body and the left vertical wing body, and the right bending wing body and the right vertical wing body are occlusal to each other.

In one form, the upper bracket is coupled to the side sill inner by projecting the left bending wing body and the right bending wing body more than the nut fastening part, and the lower bracket is coupled to the side sill inner by the nut fastening part.

In one form, each of the side sill inner and the side sill outer forms a flange portion, and the flange portions are connected to each other to form the side sill inner space.

In one form, the seat cross member forms a side cross end to overlap the side sill inner and the scrum member.

In one form, the center floor forms a side sill end at which the side sill inner is located, and a high-voltage battery is mounted on the lower portion thereof.

The scrum type side sill structure applied to the electric vehicle according to the present disclosure to configure the part of the vehicle body implements the following operations and effects.

First, the vehicle body side rigidity of the electric vehicle is reinforced by withstanding the transverse impact of the side pole collision with the scrum type side sill. Second, the scrum member applied to the scrum type side sill may reinforce the inside of the side sill with the directionality advantageous for supporting the transverse load, thereby overcoming all of the disadvantages of the aluminum extruded material vulnerable to the transverse impact and the steel press component vulnerable to the impact energy support performance with the longitudinal load support. Third, the scrum member may form the scrum reinforcement pattern of the transversely and consecutively arranged rigidity cross-sectional structure by forming the coupling between the structures of the welding coupling components, thereby being suitably applied to the length and inner structure of the side sill. Fourth, the scrum type side sill may improve the performance compared to the conventional extruded material type side sill and the steel press type side sill even while performing the inherent function of the side sill, and also reduce the cost and the weight. Fifth, the scrum type side sill is formed in the triple coupling support structure of the scrum member/the side sill inner/the seat cross member, thereby supporting the structure capable of consecutively transferring the load toward the center floor against the transverse impact of the side pole collision.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6:
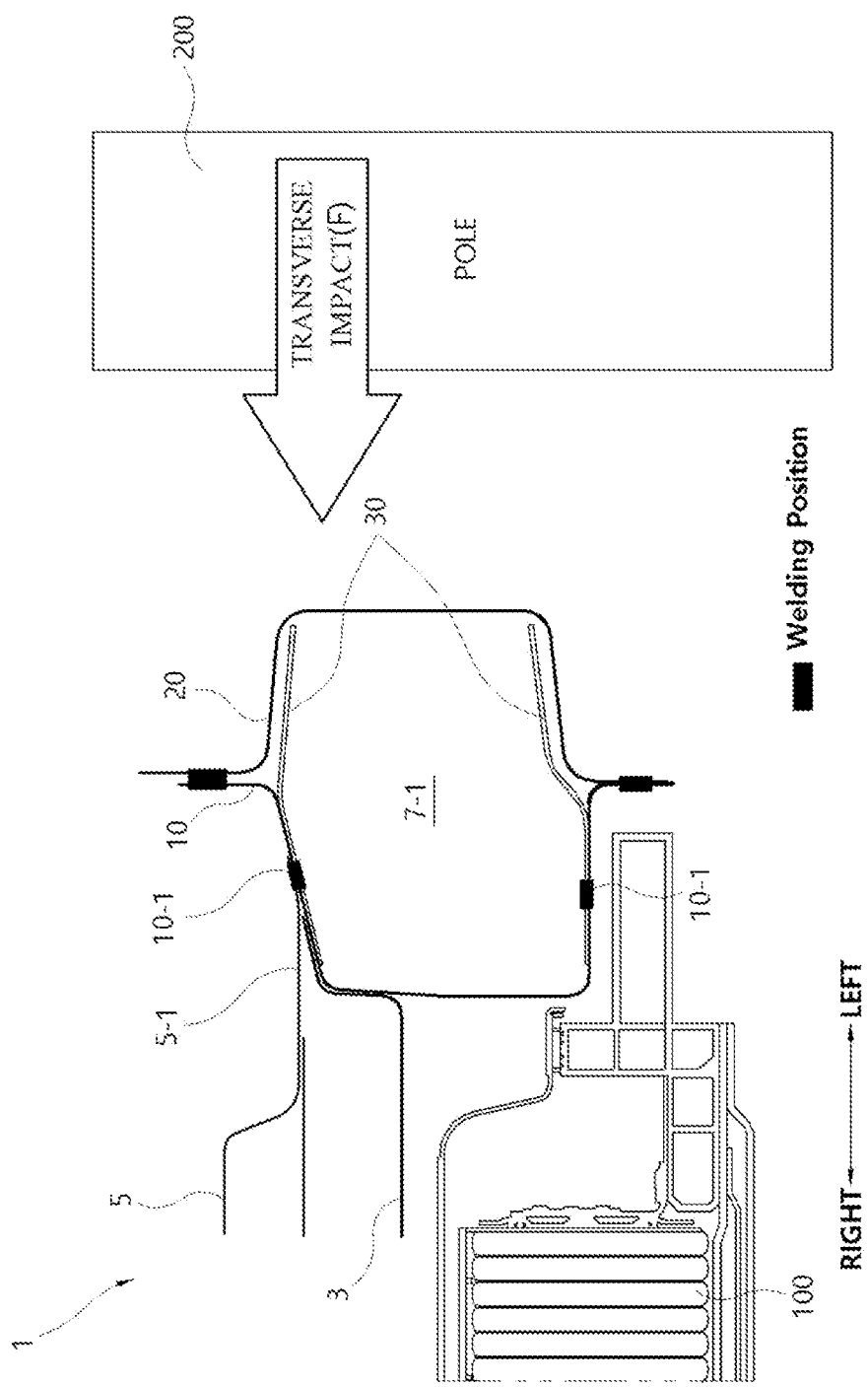
Figure 7:
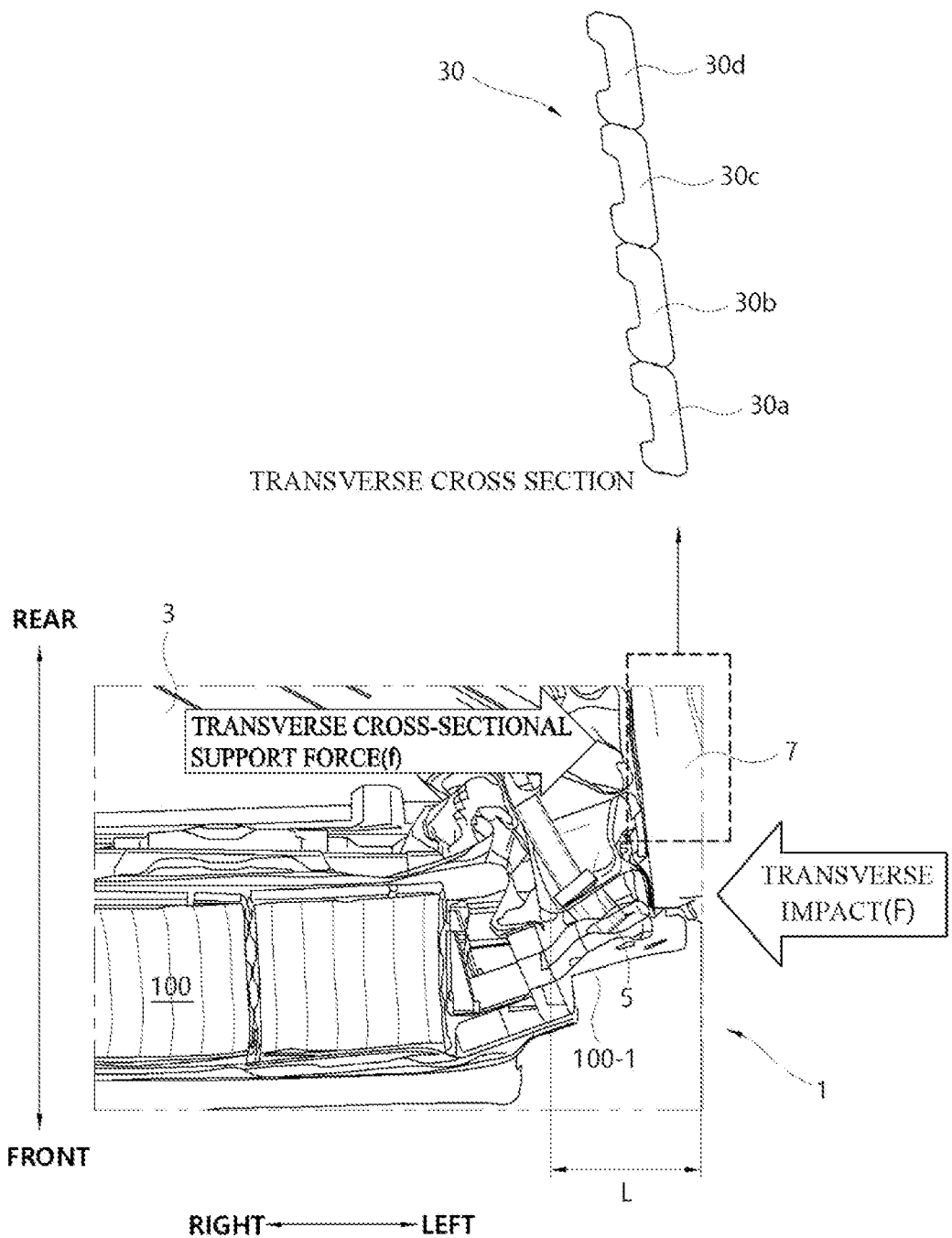

FIG. 6 is a diagram illustrating a state where the transverse impact is applied to the side sill of the vehicle body frame by the side pole collision of the electric vehicle according to the present disclosure; and FIG. 7 is a diagram illustrating a collision simulation state where the transverse impact amount applied to the scrum type side sill structure according to the present disclosure secures impact energy support performance with the transverse cross section of the scrum member.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
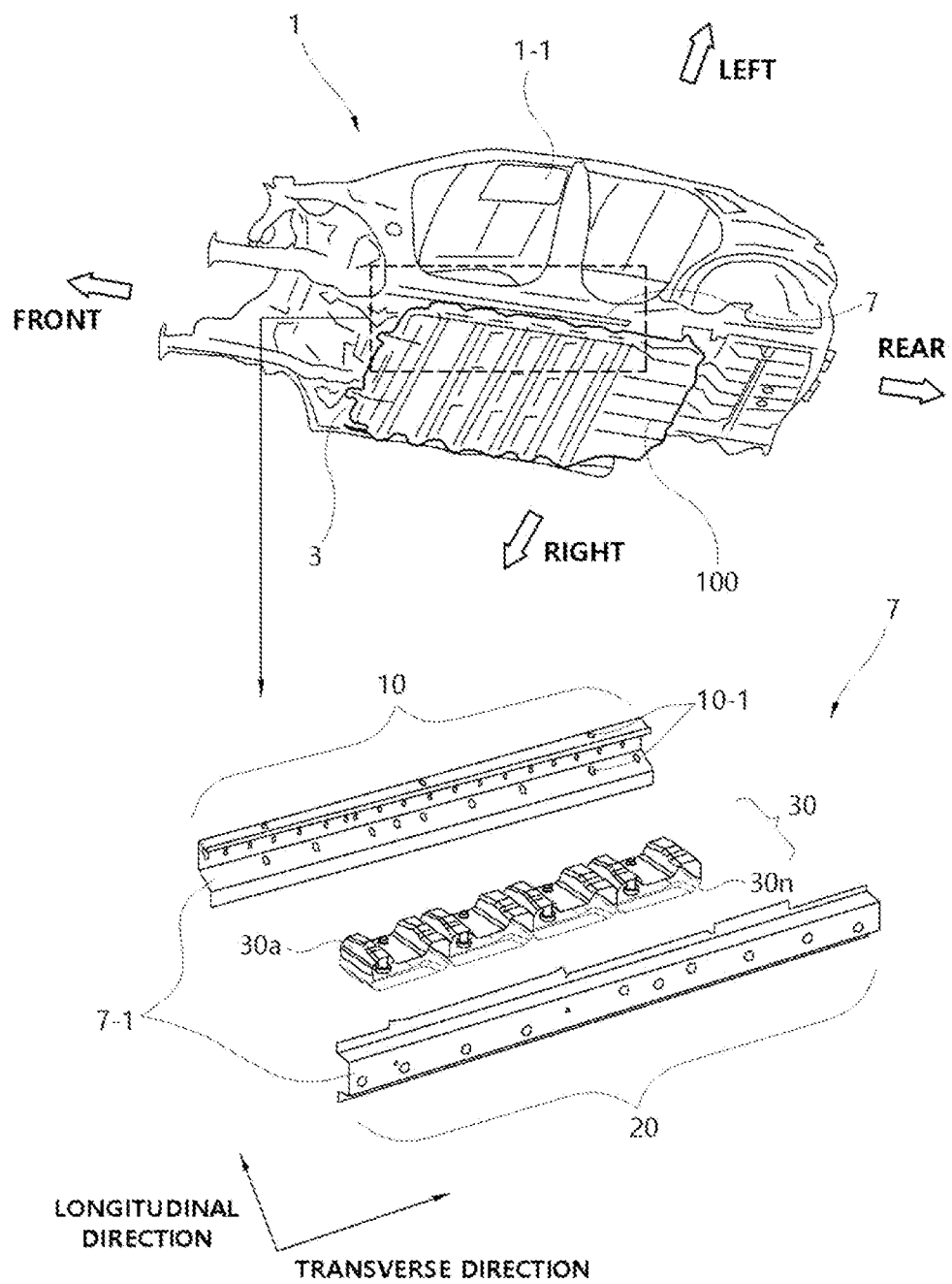
FIG. 1 is a diagram illustrating a configuration of a scrum type side sill structure applied to a vehicle body frame of an electric vehicle according to the present disclosure.

Referring to FIG. 1, an electric vehicle 1 includes a side sill 7 attached to the lower portions of both left and right side surfaces of a vehicle body frame 1-1.

Figure 4:
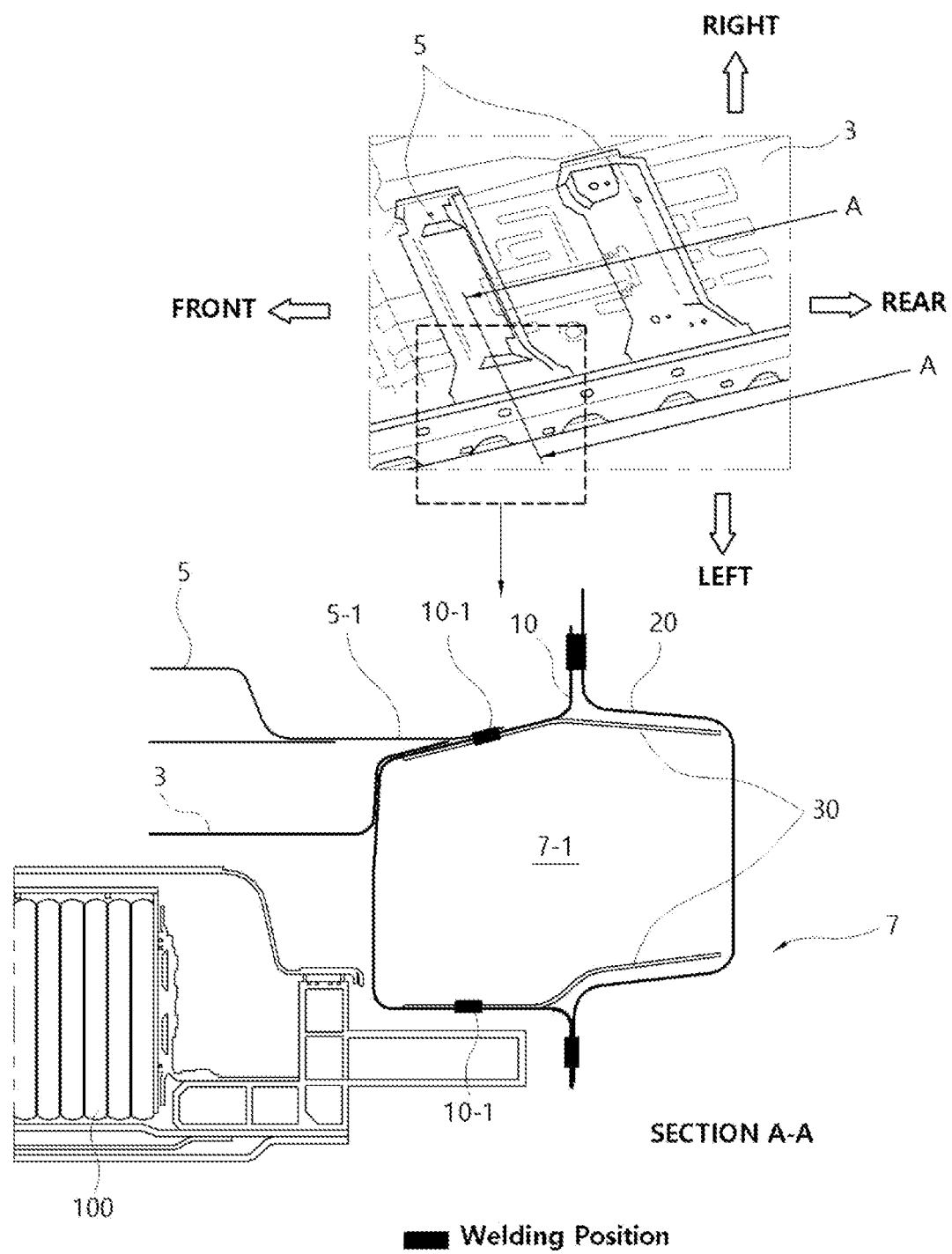
FIG. 4 is a diagram illustrating an example of the cross-sectional configuration of the scrum type side sill structure formed with the vehicle body frame of the electric vehicle according to the present disclosure.

Specifically, the vehicle body frame 1-1 includes a center floor 3 configuring a vehicle body shape body and the bottom surface thereof and a seat cross member 5 (see FIG. 4). As an example, the vehicle body shape body configures a vehicle body skeleton, the center floor 3 provides a place having a high-voltage battery 100 mounted on the lower surface thereof, and the seat cross member 5 supports the transverse deformation of the side sill 7 as the transverse member within the center floor 3.

Particularly, the center floor 3 forms a stepped part (see FIGS. 4 to 6) such that the side sill 7 is seated on both left and right side surfaces thereof.

Specifically, the side sill 7 is composed of a side sill inner 10, a side sill outer 20, and a scrum member 30, and the scrum member 30 is characterized as a scrum type side sill structure filled in a side sill inner space 7-1.

As an example, the side sill inner 10 is welded to the stepped part of the center floor 3 to be integrated with the center floor 3, and the side sill outer 20 is welded to the side sill inner 10 to be integrated with the side sill inner 10.

To this end, the side sill inner 10 and the side sill outer 20 are formed in "⊂ ⊃" and form the side sill inner space 7-1 filled with the scrum member 30 in a state of being welded to each other through flanges, which are in contact with each other on the upper and lower portions of the side sill inner and the side sill outer.

Figure 5:
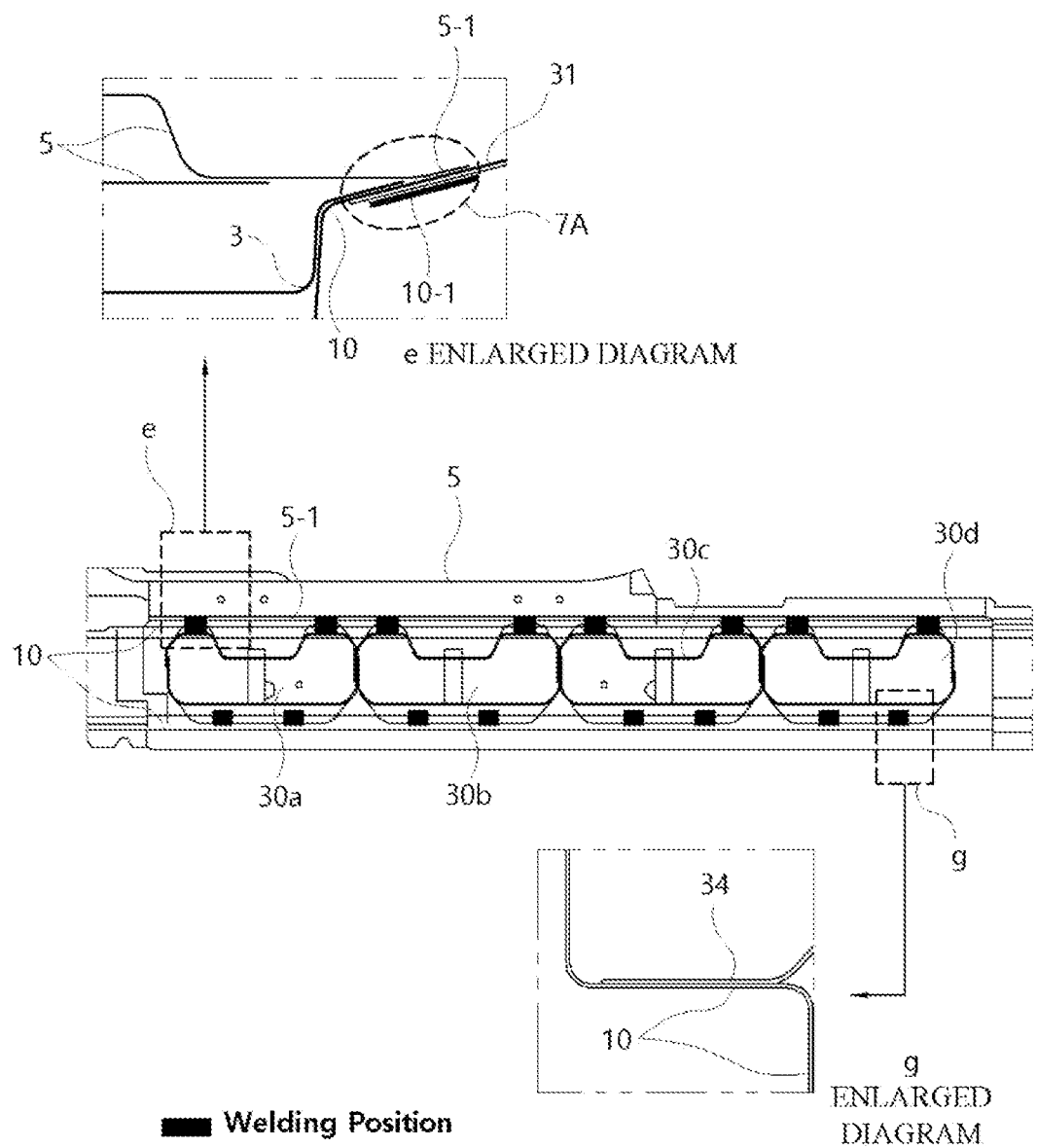
FIG. 5 is a diagram illustrating the transverse arrangement coupling state of the scrum member for configuring the cross section of the scrum type side sill structure according to the present disclosure.

Further, each of the side sill inner 10 and the side sill outer 20 has a welding parts 10-1 configuring the welding part perforated in the transverse direction (i.e., longitudinal direction of the front and rear of the vehicle), and particularly, the welding part 10-1 of the side sill inner 10 is provided as the welding position for the scrum reinforcement pattern (see FIG. 5).

As an example, the scrum member 30 is composed of $a^{th}$ to $n^{th}$ scrum members (a is 1, and n is an integer of 2 or more) consecutively arranged in the transverse direction in the side sill inner space 7-1 of the "⊂ ⊃" formed by the welded-coupling between the side sill inner 10 and the side sill outer 20.

Therefore, the side sill 7 is characterized as a scrum type side sill structure having the side sill inner space 7-1 filled with the scrum reinforcement pattern by the transverse arrangement of the $a^{th}$ to $n^{th}$ scrum members 30a, . . . , 30n configuring the scrum member 30.

Figure 2:
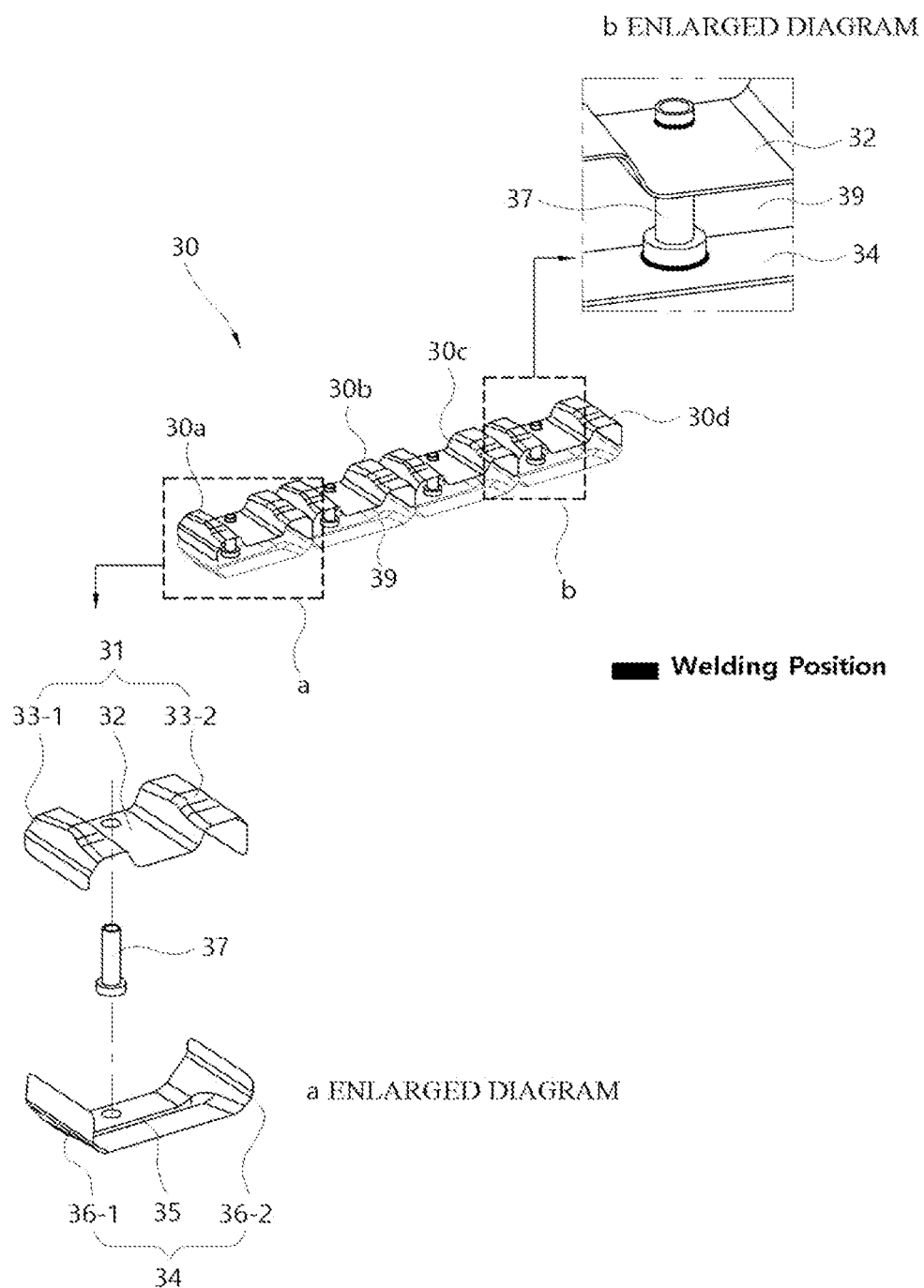
FIG. 2 is a diagram illustrating a configuration of a scrum member applied to the scrum type side sill structure according to the present disclosure.
Figure 3:
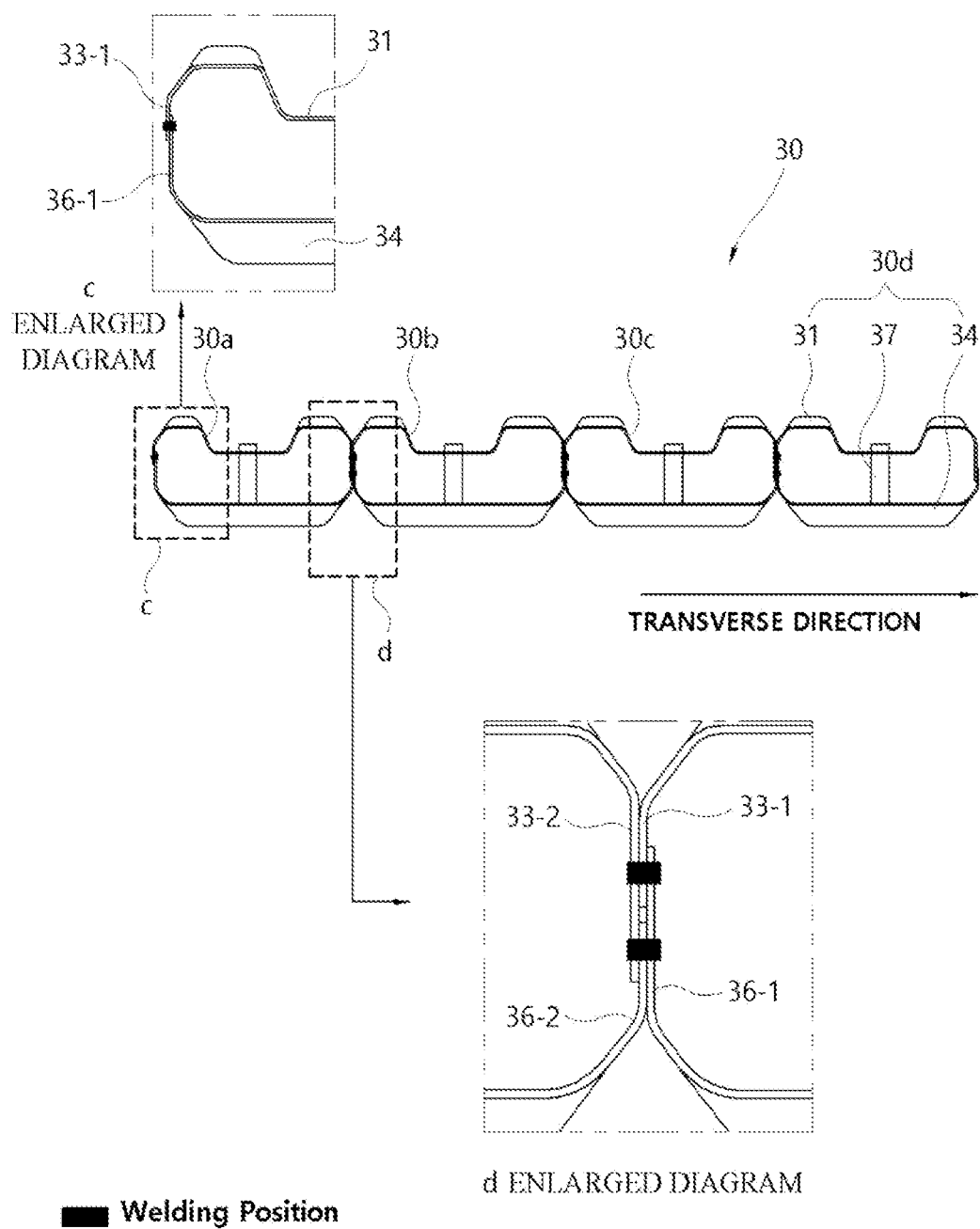
FIG. 3 is a diagram illustrating an example of the transverse arrangement layout of the scrum member according to the present disclosure.

Meanwhile, FIGS. 2 and 3 illustrate a specific configuration of the scrum member 30. In this case, the scrum member 30 will be described with an example in which n scrum members including the $a^{th}$ to $n^{th}$ scrum members 30a, . . . , 30n are composed of 4 scrum members of first to fourth scrum members 30a, . . . , 30d, but the number thereof may be changed to a proper number according to the transverse length of the side sill 7, the side sill request rigidity difference, or the like.

Therefore, the scrum member 30 is composed of a first scrum member 30a, a second scrum member 30b, a third scrum member 30c, and a fourth scrum member 30d, and each of the first to fourth scrum members 30a, 30b, 30c, 30d is configured by the same scrum member components and welded-coupled in a state of being adjacent to each other to form the transverse scrum member connecting structure.

Referring to the scrum member component illustrated in FIG. 2, each of the first to fourth scrum members 30a, 30b, 30c, 30d is composed of an upper bracket 31, a lower bracket 34, and a pipe nut 37.

As an example, the upper bracket 31 is formed of a plate having a predetermined thickness, the left portion of a nut fastening part 32 configuring a flat intermediate section is bent in a two-stage bending structure and formed as a left bending wing body 33-1, and the right portion thereof is bent in the two-stage bending structure and formed as a right bending wing body 33-2. In this case, the nut fastening part 32 locates the upper portion of the pipe nut 37 in the perforated welding hole to form the welding part.

Therefore, the upper bracket 31 has the left and right bending wing bodies 33-1, 33-2 forming the curved structure of approximately a "3" shape with the nut fastening parts 32, 35 as the intermediate section to reinforce the rigidity of the upper bracket 31, and locates the welding part 10-1 of the side sill inner 10 and a seat cross end 5-1 of the seat cross member 5 (see FIG. 4) on the flat upper surface portion of the two-stage bending structure of the left and right bending wing bodies 33-1, 33-2 to form the welding part.

As an example, the lower bracket 34 is formed of a plate having a predetermined thickness, the left portion of the nut fastening part 35 configuring the flat intermediate section is bent in a perpendicularly bending structure and formed as a left vertical wing body 36-1, and the right portion thereof is bent in a perpendicularly bending structure and formed as a right vertical wing body 36-2. In this case, the nut fastening part 35 locates the lower portion of the pipe nut 37 in the perforated welding hole to form the welding part.

Therefore, the lower bracket 34 forms a perpendicular linear structure of approximately an "U" shape of the left and right vertical wing bodies 36-1, 36-2 with the nut fastening part 35 as the intermediate section to facilitate the coupling for the left and right bending wing bodies 33-1, 33-2 of the upper bracket 31.

As an example, the pipe nut 37 locates the upper portion thereof in the welding hole perforated in the nut fastening part 32 of the upper bracket 31 to be fixed to the nut fastening part 32 by welding, and locates the lower portion thereof in the welding hole perforated in the nut fastening part 35 of the lower bracket 34 to be fixed to the nut fastening part 35 by welding.

Therefore, the pipe nut 37 is a general pipe nut, but the upper bracket 31 and the lower bracket 34 have an interval and are formed to have a predetermined length such that the scrum inner space 39 is formed therebetween, in which the predetermined length is set according to the side sill inner space 7-1.

As described above, the upper bracket 31 and the lower bracket 34 are composed of the first scrum member 30a, the second scrum member 30b, the third scrum member 30c, and the fourth scrum member 30d forming the scrum inner space 39 with the pipe nut 37 coupled by welding, and the first scrum member 30a, the second scrum member 30b, the third scrum member 30c, and the fourth scrum member 30d are formed of the first to fourth scrum members 30a, 30b, 30c, 30d integrated to one with the transverse arrangement adjacent to each other.

Referring to the transverse scrum member connecting structure illustrated in FIG. 3, the transverse scrum member connecting structure is configured such that both left and right sides of the lower bracket 34 form a staggered occlusal structure with both left and right sides of the upper bracket 31 on the lower side of the upper bracket 31. In this case, the staggered occlusal structure means that the left portion of the lower bracket 34 goes into the left portion of the upper bracket 31 whereas the right portion of the upper bracket 31 goes into the right portion of the lower bracket 34.

As an example, the transverse scrum member connecting structure is configured such that the left bending wing body 33-1 of the upper bracket 31 surrounds the left vertical wing body 36-1 of the lower bracket 34 whereas the right vertical wing body 36-2 of the lower bracket 34 surrounds the right bending wing body 33-2 of the upper bracket 31, thereby forming the state where the upper bracket 31 and the lower bracket 34 are staggered to each other.

The first to fourth scrum members 30a, 30b, 30c, 30d is configured such that both left and right edges of the first scrum member 30a and the fourth scrum member 30d allow the left bending wing body 33-1 of the upper bracket 31 to surround and weld the left vertical wing body 36-1 of the lower bracket 34 from the outside to integrate the left edge of the structure for the scrum reinforcement pattern, and the right vertical wing body 36-2 of the lower bracket 34 to surround and weld the right bending wing body 33-2 of the upper bracket 31 from the outside to integrate the right edge of the structure for the scrum reinforcement pattern.

Further, the first to fourth scrum members 30a, 30b, 30c, 30d adjacent to each other form the upper coupling portion of the upper portion and the lower coupling portion of the lower portion for the side sill inner 10.

As an example, the connecting portions between the first scrum member 30a and the second scrum member 30b is configured such that a first scrum member right connecting portion of the first scrum member 30a and a second scrum member left connecting portion of the second scrum member 30b are attached to each other and welded. That is, the first scrum member right connecting portion is formed by allowing the lower bracket 34 of the first scrum member 30a to surround and weld the right bending wing body 33-2 of the upper bracket 31 by the right vertical wing body 36-2 from the outside. Further, the second scrum member left connecting portion is formed by allowing the upper bracket 31 of the second scrum member 30b to surround and weld the left vertical wing body 36-1 of the lower bracket 34 by the left bending wing body 33-1 from the outside.

As an example, the connecting portions of the second scrum member 30b and the third scrum member 30c is configured such that the second scrum member right connecting portion of the second scrum member 30b and a third scrum member left connecting portion of the third scrum member 30c are attached to each other and welded. That is, the second scrum member right connecting portion is formed by allowing the lower bracket 34 of the second scrum member 30b to surround and weld the right bending wing body 33-2 of the upper bracket 31 by the right vertical wing body 36-2 from the outside. The third scrum member left connecting portion is formed by allowing the upper bracket 31 of the third scrum member 30c to surround and weld the left vertical wing body 36-1 of the lower bracket 34 by the left bending wing body 33-1 from the outside.

As an example, the connecting portions of the third scrum member 30c and the fourth scrum member 30d are configured such that a third scrum member right connecting portion of the third scrum member 30c and a fourth scrum member left connecting portion of the fourth scrum member 30d are attached to each other and welded. That is, the third scrum member right connecting portion is formed by allowing the lower bracket 34 of the third scrum member 30c to surround and weld the right bending wing body 33-2 of the upper bracket 31 by the right vertical wing body 36-2 from the outside. The fourth scrum member left connecting portion is formed by allowing the upper bracket 31 of the fourth scrum member 30d to surround and weld the left vertical wing body 36-1 of the lower bracket 34 by the left bending wing body 33-1 from the outside.

Therefore, when dividing the adjacent scrum members by the transverse arrangement of the first and fourth scrum members 30a, 30b, 30c, 30d into a front scrum member and a rear scrum member, the upper coupling portion forms the triple coupling of the upper bracket 31 of the front scrum member (e.g., the first scrum member 30a) and the upper bracket 31 and the lower bracket 34 of the rear scrum member (e.g., the second scrum member 30b), and the lower coupling portion forms the triple coupling of the upper bracket 31 and the lower bracket 34 of the front scrum member (e.g., the first scrum member 30a) and the lower bracket 34 of the rear scrum member (e.g., the second scrum member 30b).

Therefore, the scrum member 30 is configured by a plurality of scrum members including the first to fourth scrum members 30a, 30b, 30c, 30d filling the side sill inner space 7-1 in the transverse direction to be integrated and fixed by the upper coupling portion of the upper portion and the lower coupling portion of the lower portion with respect to the transverse cross section thereof, such that the respective scrum members form the scrum reinforcement patterns with the coupling structure for each other in the state of being adjacent to each other, and particularly, the scrum reinforcement pattern contributes to forming a strong transverse cross-sectional force (f) (see FIG. 7) in the vehicle longitudinal direction.

Meanwhile, FIGS. 4 and 5 specifically illustrate the feature of the scrum type side sill structure applied to the side sill 7.

Referring to FIG. 4, the side sill 7 is located on the stepped part of the center floor 3 to use the seat cross end 5-1 as the welding connecting portion and connected to at least one seat cross member 5.

Particularly, in the cross section A-A illustrated in FIG. 4, the side sill 7 forms the side sill inner space 7-1 by welding the flange portions of the side sill inner 10 and the side sill outer 20, and the scrum member 30 is welded with the stepped part through the welding part 10-1 of the side sill inner 10 in the side sill inner space 7-1 to be connected to the center floor 3 and welded with the seat cross end 5-1 to be connected to the seat cross member 5.

Referring to FIG. 5, the scrum inner space 39 form the consecutive transverse rigidity cross section in the state where the first to fourth scrum members 30a, 30b, 30c, 30d are arranged in the transverse direction at the same width and height as those of the side sill inner space 7-1.

Particularly, the transverse rigidity cross section is formed in a scrum reinforcement pattern similar to the scrum pattern of a rugby game through the consecutive coupling between the respective structures of the first to fourth scrum members 30a, 30b, 30c, 30d, and the scrum reinforcement pattern has the performance more than the rigidity owned by the side sill inner/outer structures (i.e., the scrum member 30 and the seat cross member 5) to form the transverse rigidity cross section (see FIG. 7) strong to the transverse impact F.

Further, each of the first to fourth scrum members 30a, 30b, 30c, 30d allows the upper bracket 31 to form two welding parts using the flat upper surface portions of the left and right bending wing bodies 33-1, 35-2, and the lower bracket 34 to form two welding parts using the nut fastening part 35.

Particularly, the welding part of the upper bracket 31 forms the scrum reinforcement pattern, and the scrum reinforcement pattern is formed in a welding structure in which the welding part 10-1 of the side sill inner 10, the left and right bending wing bodies 33-1, 35-2 of the upper bracket 31, and the seat cross end 5-1 of the seat cross member 5 overlap each other to form the direct welding coupling structure between the side sill inner/outer structure (i.e., the scrum member 30 and the seat cross member 5) with respect to the side sill 7.

As described above, the scrum reinforcement pattern may allow the scrum member 30 of the seat cross member 5/the side sill inner 10/the side sill inner structure to enable the consecutive load transfer and the structure support with the triple coupling, thereby eliminating the disadvantage of the conventional structure in which the load transfer is cut off because the seat cross member 5 and the side sill inner structure (i.e., aluminum extruded material or steel press component) are not coupled.

Meanwhile, FIGS. 6 and 7 illustrate the simulation performance results for the side sill 7 to which the first to fourth scrum members 30*a*, 30*b*, 30*c*, 30*d* are applied as the scrum member 30 in the side pole collision test in which the side of the electric vehicle 1 collides with a collision body 200.

In this case, the simulation performance results illustrated in FIGS. 6 and 7 are derived through the following conditions.

As an example, the scrum type side sill structure of the electric vehicle 1 is applied with the side sill inner 10 located on the side surface of the center floor 3 forming the bottom of the vehicle body, the side sill outer 20 coupled to the side sill inner 10 to form the side sill inner space 7-1, and the scrum member 30 provided in the side sill inner space 7-1 in the transverse direction, and forming the transverse cross section of the side sill inner space 7-1 with the scrum reinforcement pattern.

Therefore, the electric vehicle 1 includes: the side sill 7 forming the transverse cross section of the side sill inner space 7-1 with the scrum reinforcement patterns using the plurality of first, second, third, and fourth scrum members 30*a*, 30*b*, 30*c*, 30*d*; the center floor 3 forming the bottom of the vehicle body and having the side sill 7 coupled to the left and right portions thereof; the seat cross member 5 supporting the transverse deformation of the center floor 3, and connected to the plurality of first, second, third, and fourth scrum members 30*a*, 30*b*, 30*c*, 30*d*; and the high-voltage battery 100 mounted on the lower portion of the center floor 3, in the side sill inner space 7-1 formed by the side sill outer 20 coupled to the side sill inner 10 located on the side surface of the center floor 3 forming the bottom of the vehicle body.

Particularly, the center floor 3, the seat cross member 5, the side sill inner 10, the side sill outer 20, and the plurality of first, second, third, and fourth scrum members 30*a*, 30*b*, 30*c*, and 30*d* are coupled by welding, and the scrum reinforcement pattern forms the triple coupling structure with respect to each other in the state where the plurality of first, second, third, and fourth scrum members 30*a*, 30*b*, 30*c*, 30*d* are adjacent to each other and arranged in the transverse direction to be located in the vehicle longitudinal direction.

Further, the center floor 3 forms the side sill end to which the side sill 7 is coupled to the left and right portions thereof, and a plurality of seat cross members 5 are formed at intervals to form the seat cross end 5-1, respectively and connected to the plurality of first, second, third, and fourth scrum members 30*a*, 30*b*, 30*c*, 30*d* in the state of overlapping with the side sill inner 10.

Referring to FIG. 6, in the side pole collision test, the collision body 200 collides with the side sill 7, such that the transverse impact (F) applied by the collision body 200 is distributed to the center floor 3 and the seat cross member 5 via the scrum member 30 of the side sill 7 and transferred to the high-voltage battery 100 mounted on the lower portion of the center floor 3.

Referring to FIG. 7, the side sill 7 forms the transverse cross section in which the first to fourth scrum members 30*a*, 30*b*, 30*c*, 30*d* are consecutive in the transverse direction in the side sill inner space 7-1, and the transverse cross section forms the transverse cross-sectional support force (f) with the consecutive scrum reinforcement pattern of the structure for the scrum reinforcement pattern (see FIG. 3).

Therefore, the transverse cross-sectional support force (f) implements the primary energy absorption performance for the transverse impact (F) applied by the collision body 200, thereby inhibiting the side sill 7 from being pushed toward the high-voltage battery 100.

Further, the side sill 7 forms the scrum reinforcement pattern (see FIG. 5) with the triple coupling structure of the scrum member 30 of the seat cross member 5/the side sill inner 10/the side sill inner structure, and the scrum reinforcement pattern supports the transverse cross section of the first to fourth scrum members 30*a*, 30*b*, 30*c*, 30*d* inside the center floor 3.

Therefore, the scrum reinforcement pattern, as the transverse cross-sectional support structure, implements the secondary energy absorption performance for the transverse impact (F) applied by the collision body 200, thereby further reinforcing the energy distribution and support performance for the transverse cross-sectional support force (f).

As described above, the scrum type side sill 7 may have the scrum reinforcement pattern of the structure for the consecutive scrum reinforcement pattern of the first to fourth scrum members 30*a*, 30*b*, 30*c*, 30*d* and two-time energy absorption/distribution and the support performance by the scrum reinforcement pattern, thereby eliminating the structural disadvantage in that the load transfer is cut off because the seat cross member 5 and the side sill inner structure are not coupled when applying the conventional aluminum extruded material or the steel press component.

Therefore, the simulation result of the side pole collision test proved that the scrum type side sill 7 reduced a side sill intrusion amount (L) generated by the transverse impact (F) applied by the collision body 200 by about 15 to 25% compared to the application of the conventional aluminum extruded material or the steel press component, such that the high-voltage battery 100 could secure the safety by the reduced level from the damage riskiness.

As described above, the side sill 7 applied to the electric vehicle 1 according to the present disclosure may include the scrum type side sill structure forming the transverse cross section of the side sill inner space 7-1 with the scrum reinforcement pattern using the plurality of first, second, third, and fourth scrum members 30*a*, 30*b*, 30*c*, 30*d* coupled as the structure for the scrum reinforcement pattern for each other in the side sill inner space 7-1, which is formed by the side sill outer 20 coupled to the side sill inner 10 located on the side surface of the center floor 3 forming the bottom of the vehicle body. The present disclosure provides the directionality advantageous for supporting the transverse load with the transverse cross-sectional structure and the transversely and consecutively arranged rigidity cross-sectional structure, and thus is advantageous for supporting the impact energy applied by the transverse impact of the side pole collision, and particularly, the plurality of first, second, third, and fourth scrum members 30*a*, 30*b*, 30*c*, 30*d* may be coupled to the seat cross member 5 through the side sill 7, thereby consecutively transferring the load with the triple coupling support structure.

What is claimed is:

1. A side sill structure of an electric vehicle, the side sill structure comprising:
    a side sill inner located on a side surface of a center floor, wherein the center floor forms a bottom of a vehicle body;
    a side sill outer coupled to the side sill inner and configured to form a side sill inner space; and a plurality of scrum members provided in the side sill inner space in a longitudinal direction of the electric vehicle.

2. The side sill structure of claim 1, wherein the plurality of scrum members are fixed to the side sill inner by welding.

3. The side sill structure of claim 1, wherein each scrum member of the plurality of scrum members includes an upper bracket and a lower bracket in which a scrum inner space is formed.

4. The side sill structure of claim 3,
wherein scrum members of the plurality of scrum members are arranged adjacent to each other, the scrum members are divided into a front scrum member and a rear scrum member, and at least one scrum member of the plurality of scrum members form an upper coupling portion and a lower coupling portion,
wherein the upper coupling portion couples the upper bracket of the front scrum member, the upper bracket of the rear scrum member, and the lower bracket of the rear scrum member, and
the lower coupling portion couples the upper bracket of the front scrum member, the lower bracket of the front scrum member, and the lower bracket of the rear scrum member.

5. The side sill structure of claim 4, wherein the upper coupling portion and the lower coupling portion are formed on a side surface portion in which the upper bracket and the lower bracket are in contact with each other.

6. The side sill structure of claim 4, wherein the upper bracket of the front scrum member, the upper bracket of the rear scrum member, and the lower bracket of the rear scrum member are coupled by welding, and the upper bracket of the front scrum member, the lower bracket of the front scrum member, and the lower bracket of the rear scrum member are coupled by welding.

7. The side sill structure of claim 3, wherein the upper bracket and the lower bracket are fastened by a pipe nut to form the scrum inner space.

8. The side sill structure of claim 7, wherein
a nut fastening part of the upper bracket to which an upper portion of the pipe nut is fastened is configured as an intermediate section forming a left bending wing body and a right bending wing body,
a nut fastening part of the lower bracket to which a lower portion of the pipe nut is fastened is configured as an intermediate section forming a left vertical wing body and a right vertical wing body, and
the left bending wing body and the left vertical wing body, and the right bending wing body and the right vertical wing body are occlusal to each other.

9. The side sill structure of claim 8, wherein the upper bracket is coupled to the side sill inner by projecting the left bending wing body and the right bending wing body more than the nut fastening part.

10. The side sill structure of claim 8, wherein the lower bracket is coupled to the side sill inner by the nut fastening part.

11. The side sill structure of claim 7, wherein the pipe nut stands vertically in the scrum inner space in a linear length.

12. The side sill structure of claim 1, wherein the plurality of scrum members are connected to a seat cross member located on an upper portion of the center floor.

13. The side sill structure of claim 1, further comprising a high-voltage battery mounted on the center floor.

* * * * *